Feb. 1, 1966
T. D. FELDER, JR
3,232,713
APPARATUS FOR CONVERTING OXIDES OF NITROGEN TO INNOCUOUS GASES
Filed Oct. 23, 1961
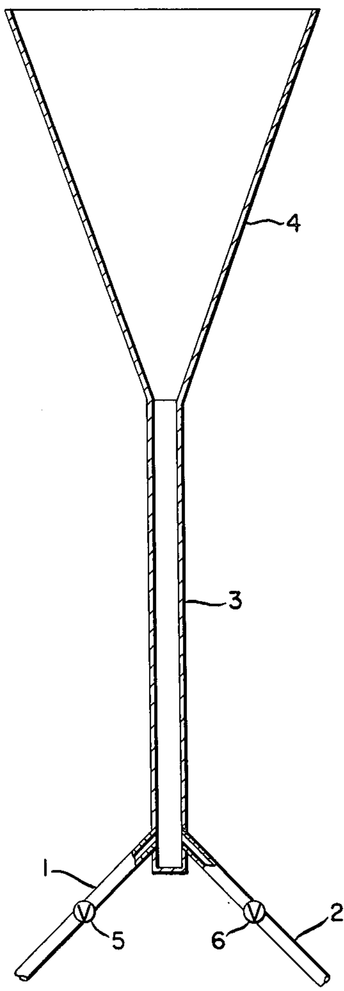
INVENTOR
THOMAS D. FELDER, JR.
BY Earl L. Handley
ATTORNEY United States Patent Office 3,232,713

Patented Feb. 1, 1966

3,232,713

APPARATUS FOR CONVERTING OXIDES OF NITROGEN TO INNOCUOUS GASES

Thomas Dewey Felder, Jr., Orange, Tex., assignor to E. I. du Pont de Nemours and Company, Wilmington, Del., a corporation of Delaware Filed Oct. 23, 1961, Ser. No. 146,865
1 Claim. (Cl. 23—277)

This invention relates to the disposal of industrial waste gases and more particularly relates to converting gases containing undesirable quantities of nitrogen oxides (NO and $NO_2$), which should not be discharged directly into the atmosphere, to innocuous gases that can be so discharged.

Investigations are being made on the various waste products of the chemical industry with the object in view of transforming the waste, chemically, biologically, or otherwise, to products that can be discharged without pollution into the air as gases or into streams as liquids. Coagulants, precipitating agents, settling beds, and biological and chemical processes are under investigation. Some are being used to improve the environment and potential health of marine, vegetable, and animal life. Such processes are described in the D. V. Moses et al. U.S. Patent 2,690,425, issued September 28, 1954; Adkins et al. U.S. Patent 2,091,800; and the E. Childers et al. U.S. Patent 2,910,343, issued October 27, 1959 The invention relates to an improved apparatus for effecting such results.

Objects of the invention include a method of converting nitrogen oxide waste gases to innocuous gases; an apparatus in which to conduct the conversion efficiently; and a process in which the nitrogen oxide content of stack gases and like effluent gases is reduced to harmless concentrations of those gases. Other objects and advantages of the invention will hereinafter appear.

Toxic and unsightly gas streams are produced by the chemical industry from reactions involving a multiplicity of organic and inorganic nitrations in which strong nitric acid is generally used. For example, in the processes described in the McAlevy et al. U.S. Patent 2,557,282, issued June 19, 1951; and the Hamblet et al. U.S. Patent 2,713,067, issued July 12, 1955, cyclohexanone and cyclohexanol are oxidized by concentrated nitric acid to adipic acid and various other products. The effluent off-gas of these processes is quite noxious. In accord with the invention, such gases and the like are made innocuous by subjecting them to a reaction conducted in the following manner:

The invention will be more readily understood by reference to the drawing which illustrates, in diagrammatical form, an improved stack structure in which the process of the invention is carried out. The device is composed of inlet conduits 1 and 2, a stack or base cylinder 3, and a flared conical discharge cap 4. Off-gas, or any gas containing nitrogen oxides in concentrations that are noxious, is fed into conduit 2; a reducing gas such as natural gas is fed into conduit 1; these gases enter the cylindrical portion 3 of the stack via ports 5 and 6 and as the resulting mixture flows into the conical (inverted) discharge cap 4 the mixture is ignited and the nitrogen oxides present converted to nitrogen and water.

As shown in the drawing, the mixing chamber is a hollow cylinder, and the burning chamber is the inverted frustum of a cone. The internal diameter of the mixing chamber and the internal diameter of the small end of the frusto-conical burning chamber are the same.

The waste gas must contain or be supplemented with sufficient oxygen to form a combustible mixture with the combustible gas. In the usual case, oxygen will need to be added to the mixture to insure combustion, as the oxygen which is supplied from the NO, $NO_2$ and $N_2O_3$ is insufficient, but in some instances, the amount of nitrogen oxides in the waste gas may be high enough that no additional oxygen need be added. The amount of oxygen, calculated as $O_2$, necessary to maintain combustion is 15 to 30 moles per 100 moles of waste gas reacted.

Research work conducted on the use of free jet burning, in a cylindrical section, and burning in a conical section, all demonstrated the flammability of the mixture of off-gas and a combustible gas, such as hydrogen, methane, natural gas, etc. Difficulty was encountered in either containing the flame in the cylindrical burner or maintaining the flame in a free jet. The difficulty with the cylindrical burner was caused by the continuously changing composition of off-gas, which varied the flame propagation rate. Any change in flame propagation rate tended to move the flame up or down in the cylindrical burner, with its fixed cross-section. Also, the nitric oxide(s) leakage was in the range of visibility (550 p.p.m. calculated as $NO_2$). Generally, where low turbulence was required to maintain combustion, such as burning in a cylindrical section or a free jet, considerable leakage of nitrogen oxides resulted. Free jet flames were unstable and strongly affected by wind. Wind velocities in the 5–10 m.p.h. range greatly increased the flame-out occurrences.

The conical burner of the invention did not have the basic weaknesses of the free jet burner and the cylindrical burner. The variable cross-section of the cone compensated for fluctuations in the off-gas composition and the burner walls provided wind protection. It was found that the combustion gas consumption was minimized at an apex angle of between 35 and 45°, and preferably at about 40°. The nitrogen oxide leakage, however, was not affected by the apex angle size. The height of the burner seemed to have no serious effect either on fuel consumption or nitrogen oxide leakage.

The velocity at which the combustion mixture of fuel and waste gas are forced into the cone shaped burner has a decided influence on the amount of fuel that is necessary to maintain combustion and the effectiveness of the reduction process. It has been determined that if the inlet velocity of combustible mixture exceeds about 120 ft./sec., a higher fuel concentration is required to maintain the combustion. In other words, the flame propagation rate is approximately constant for any particular combustible mixture of the gases; and if the flow of gas of a particular mixture is increased, the flame tends to move further up the cone; and if the flow is still further increased, the flame will move entirely out of the cone, and thus be subject to the same deficiencies as a cylindrical burner. Increased flow rate may be achieved by increasing the flame propagation rate by enriching the mixture with fuel.

If the rate of flow of the combustible mixture is too low, the amount of nitrogen oxides that escapes unreduced increases. Thus, at velocities below 20 ft./sec., the amount of nitrogen oxides that escapes unreduced is unsatisfactorily high. This is perhaps due to ineffective mixing of the gases. The mixture can be improved by use of suitable baffles that increase the turbulence of the flow, but it is preferred to operate at such a velocity, i.e., above 20 ft./sec., that the speed of the gas flow will cause a turbulent mixing of the gases.

The table which follows records data obtained on conversion of an off-gas from the nitric acid oxidation of cyclohexanol and cyclohexanone to adipic acid to an innocuous gas. The concentration of the components lay between the ranges indicated.

| Component: | Volume percent |
|---|---|
| $N_2$ | 51.0–81.9 |
| $O_2$ | .4–20.0 |
| CO | .4–3.27 |
| $CO_2$ | .88–5.6 |
| $N_2O$ | 6.93–33.3 |
| $NO+NO_2$ | .1–2.35 |
| $H_2O$ | (1) |

[1] Saturated at 40° C.

*Table*

| Off-Gas Flow, s.c.f.h. | Natural Gas Flow, s.c.f.h. | Inlet Velocity, ft./sec. | Off-Gas Nat. Gas, s.c.f./s.c.f. | Leakage, p.p.m. $NO_2$ |
|---|---|---|---|---|
| 5,000 | 700 | 26 | 7.0 | 5 |
| 16,100 | 2,000 | 80.5 | 8.1 | 5 |
| 9,100 | 1,800 | 120 | 5.05 | 5 |
| 10,500 | 2,200 | 140 | 4.77 | 5 |

The above examples were carried out in an apparatus substantially as shown in the drawing, in which cylindrical section 3 was 10 feet long and 1 foot in diameter; the apex diameter of the cone was 1 foot and the flared top diameter was 6.5 feet; and the apex angle was 40°. The natural gas concentration necessary to maintain combustion varied between 8 and 16 volume percent of total burner fuel.

The conical burner of the invention should, for optimum operation, have these specifications: the cylindrical section, designated 3 in the drawing, a diameter-to-length of about 1.0 to at least about 3, the inverted cone, apex diameter to the flared top diameter of 1.0 to at least about 6; and an apex angle in the cone of between 35° and 45°—preferably 40°. The volume of the cone should be at least about 0.25 cu. ft./m.c.f.h. of gas to be abated.

The process and apparatus described is adaptable for use in the treatment of nitrogen oxide-containing gases from any source where a combustible mixture can be formed with a fuel and is for use especially in those localities where air pollution should be avoided. The reduction of noxious gas content from nitric fumes resulting from the use of nitric acid to oxidize a ketone-alcohol mixture has been successfully accomplished by the invention herein-described whereby exhaust gases containing no dangerous or undesirable traces are freely discharged to the atmosphere.

I claim:

An apparatus for reducing nitrogen oxide fumes in a waste gas which consists essentially of a cylindrical mixing chamber having a diameter to length ratio of 1 to at least 3, said mixing chamber having two inlet ports near one end, a frusto-conical burning chamber having an apex angle of between 35° and 45° and a ratio of diameter of the small end of the frusto-conical burning chamber to diameter of the large end of the frusto-conical burning chamber of about 1 to 6.5, the small end of the frusto-conical burning chamber abutting against the end of the mixing chamber farther removed from the inlet ports, the small end of the frusto-conical burning chamber having the same internal diameter as the end of the mixing chamber against which it abuts.

References Cited by the Examiner

UNITED STATES PATENTS

| | | | |
|---|---|---|---|
| Re. 24,550 | 10/1958 | Sachsse et al. | 260—679 |
| 1,775,565 | 9/1930 | Kessler | 23—277 |
| 1,992,136 | 2/1935 | Wakefield | 23—2 |
| 2,498,444 | 2/1950 | Orr | 23—277 X |
| 2,506,853 | 5/1950 | Berg et al. | 158—991 X |
| 2,521,541 | 9/1950 | Schneible et al. | 23—277 |
| 2,522,475 | 9/1950 | Walker | 23—2 |
| 2,848,305 | 8/1958 | Lehrer et al. | 23—277 |

FOREIGN PATENTS

| | | |
|---|---|---|
| 861,638 | 11/1940 | France. |

MORRIS O. WOLK, *Primary Examiner.*

MAURICE A. BRINDISI, *Examiner.*